J. A. ALVEY.
BEARING FOR CONVEYER ROLLERS.
APPLICATION FILED JULY 5, 1912.
1,141,514.
Patented June 1, 1915.
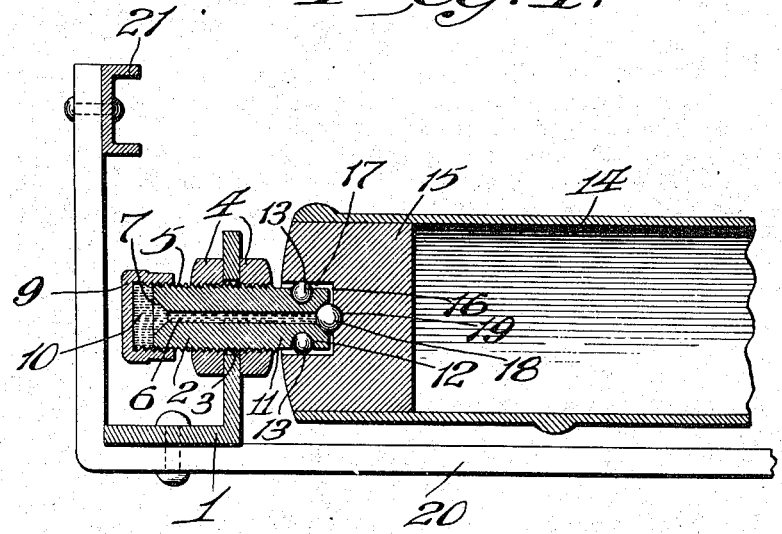
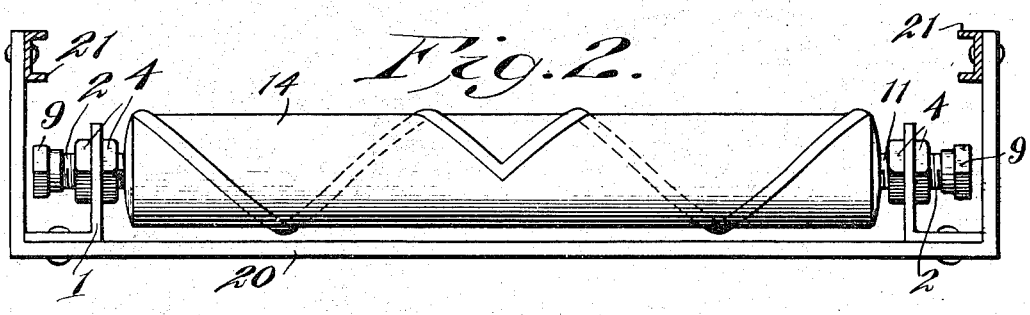

UNITED STATES PATENT OFFICE.

JOHN A. ALVEY, OF ST. LOUIS, MISSOURI, ASSIGNOR, BY MESNE ASSIGNMENTS, TO ALVEY MANUFACTURING COMPANY, OF ST. LOUIS, MISSOURI, A CORPORATION OF MISSOURI.

BEARING FOR CONVEYER-ROLLERS.

1,141,514.  Specification of Letters Patent.  Patented June 1, 1915.

Original application filed October 4, 1911, Serial No. 652,830. Divided and this application filed July 5, 1912. Serial No. 707,837.

*To all whom it may concern:*

Be it known that I, JOHN A. ALVEY, a citizen of the United States of America, residing in the city of St. Louis and State of Missouri, have invented certain new and useful Improvements in Bearings for Conveyer-Rollers, of which the following is a specification.

The subject matter of this application is divided from my application Serial No. 652,830, filed October 4, 1911 and patented May 5, 1914, No. 1,095,445.

My invention relates to an antifriction mounting for rollers and is particularly adapted for use in connection with rollers of a gravity conveyer.

Among the principal objects of my invention are, to provide an antifriction bearing which is capable of maintaining its efficiency under conditions subjecting it to end thrust and which may be adjusted to compensate for wear.

Further objects of my invention will more fully appear hereinafter.

The invention consists in the construction and in the arrangement and combination of parts hereinafter more fully set forth.

In the accompanying drawing, which forms part of this specification, and in which like reference characters refer to like parts throughout the several views, Figure 1 is a longitudinal section through a bearing embodying my invention, one end of a roller being shown mounted thereon; and Fig. 2 is a view showing the full length of the roller with its supports at both ends.

In the preferred form of my invention shown in Fig. 1, the supports 1 for the bearing spindles 2 are constructed of angle iron. Only one of these supports is shown, but it is to be understood that this construction is duplicated for the other end of the roller. Holes 3 are drilled in the vertical leg of the angle iron 1 at suitable distances apart, and through these holes are passed the bearing spindles 2. The construction of each bearing is the same, and a description of one will suffice for all. The bearing spindle 2 is provided with screw-threads 5 for a portion of its length and is held firmly in position by the locking nuts 4 which are mounted on the threaded portion 5 and engage opposite sides of the vertical leg of the angle iron 1.

Extending longitudinally through the bearing spindle 2 is a channel 6 which communicates with a recess 7 in one end of the bearing spindle 2, and with a recess 8 at the opposite end of said bearing spindle. Screwed over the end of the bearing spindle 2, adjacent to the recess 7, is a cup-shaped cap or gland nut 9, which, in connection with the recess 7, forms a chamber 10. Formed on the bearing spindle 2 opposite to its threaded end 5, is a journal 11 provided with a raceway 12 for receiving bearing balls 13. The roller 14 is preferably constructed of seamless tubing, and in each end of the roller is secured a block 15. A central well or bearing recess 16 is formed in the outer end face of said block 15, and is adapted to receive the journal 11. The bearing balls 13 in the raceway 12 engage with the circumferential face 17 of the well 16. In the recess 8 of the spindle 2 is mounted a bearing ball 18 which engages a mating recess 19 formed in the bottom of the well 16.

The angle iron supports 1 are mounted upon bars 20 bent in a U-shape. The vertical legs of the U-shape bars 20 support guiding bars 21.

The chamber 10 is filled with grease or other suitable lubricant, and by screwing the gland nut 9 down over the end of the spindle 2, the grease may be forced from the recess 7 along the channel 6 to the recess 8. This serves to lubricate the bearing balls 13 and 18. By screwing the locking nuts 4 in opposite directions, the bearing spindle may be adjusted in the angle iron 1, and when the nuts 4 are jammed tight against the opposite faces of the vertical leg of said angle iron 1, the spindle 2 is held firmly in its adjusted position.

In the modified form of my invention shown in Fig. 2 the supports for the bearing spindles are formed of channels 22. Each channel 22 is provided with a series of screw-threaded openings 23, in each of which the threaded portion of a bearing spindle 2 engages. A single locking nut is provided for each bearing spindle 2 and is mounted on the outer face of the channel 22.

This construction is employed where channel irons are used as supports, because it would be difficult to manipulate a locking nut if it were placed in the recess of the channel.

Obviously, my device admits of considerable modification without departing from my invention, and therefore I do not wish to be limited to the particular construction which I have shown and described.

What I claim is:

1. A bearing for conveyer rollers comprising two approximately parallel spindle supports of relatively thin rolled metal connected at intervals, two spindles mounted in adjusted position in oppositely disposed transverse holes in said spindle supports, said holes being larger than said spindles, whereby said spindles can be adjusted in axial alinement, each of said spindles being screw-threaded for a portion of its length and having said screw-threaded portion disposed through the hole therefor, a pair of nuts on the screw-threaded portion of each spindle, one of said nuts being arranged on each side of the corresponding spindle support, said nuts clamping said spindle support between them, the inwardly projecting ends of said spindles constituting bearings, said conveyer roller having a recess in each end face thereof, said recesses being adapted to receive the bearing ends of said spindles, and thrust bearings in said recesses between the bottoms of said recesses and the ends of said spindles.

2. A bearing for a conveyer roller, said bearing comprising two approximately spaced parallel spindle supports of relatively thin rolled metal and connected at intervals, spindles screw-threaded for a portion of their length and mounted in oppositely alined holes in said spindle supports, said holes being larger than said spindles, whereby said spindles can be adjusted in axial alinement, a pair of nuts on the screw-threaded portion of each spindle, one of said nuts being arranged on each side of the corresponding spindle support, said nuts clamping said spindle supports between them, each spindle having a ball recess at its inner end and a ball race around it adjacent thereto, said conveyer roller having recesses in its end faces adapted to receive the inner ends of said spindles, and bearing balls in said ball races and said ball recesses arranged to contact with the side and bottom walls of said recesses of said conveyer roller.

JOHN A. ALVEY.

In the presence of—
M. C. HAMMON,
H. G. FLETCHER.